Patented Dec. 29, 1925.

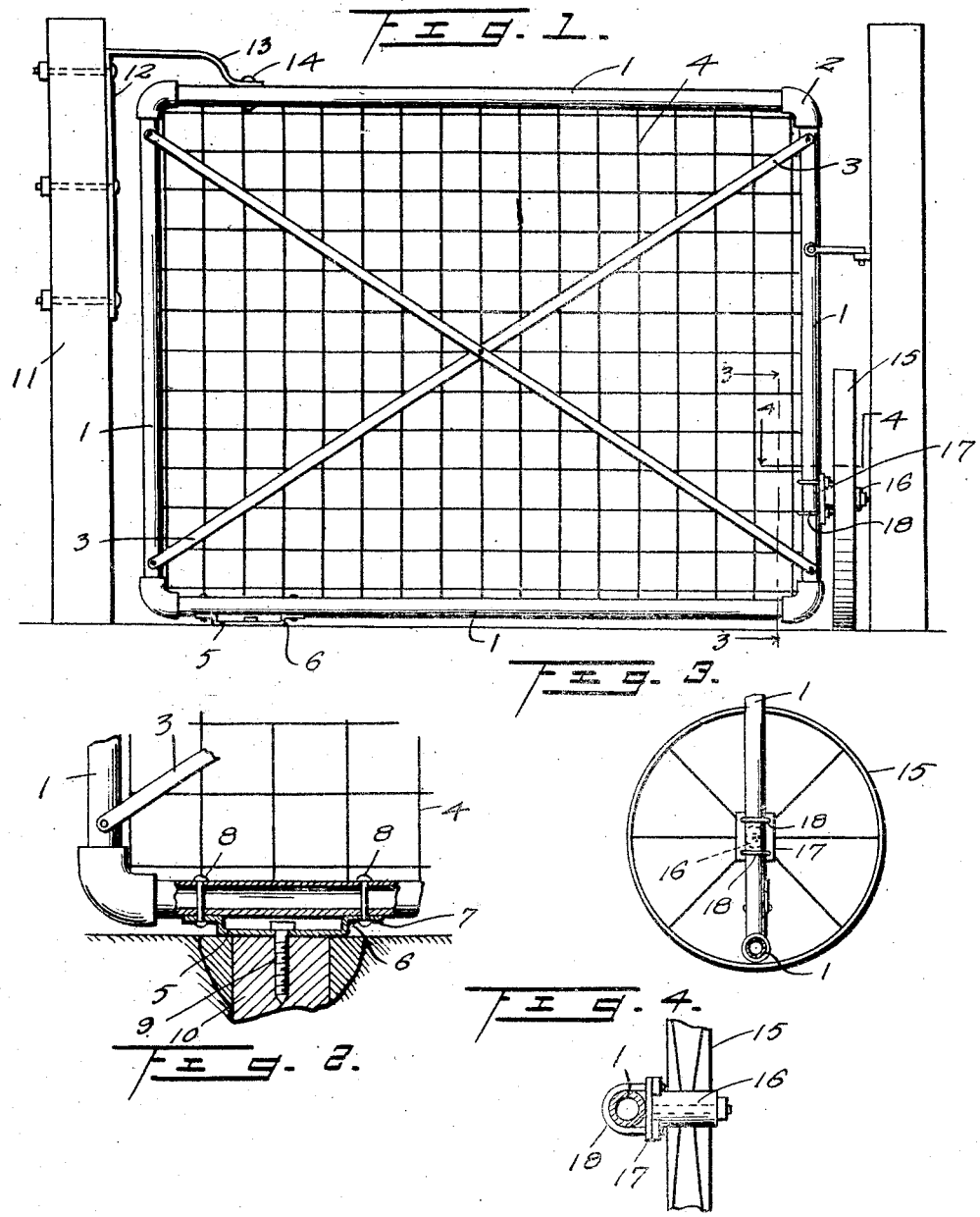

1,567,932

UNITED STATES PATENT OFFICE.

EDWARD ESCHENBACHER, OF BRAINERD, MINNESOTA.

SAGLESS GATE.

Application filed July 7, 1925. Serial No. 42,050.

*To all whom it may concern:*

Be it known that I, EDWARD ESCHENBACHER, a citizen of the United States, residat Brainerd, in the county of Crow Wing and State of Minnesota, have invented certain new and useful Improvements in Sagless Gates; and I do hereby declare the following to be a full, clear, and exact description of the invention, such as will enable others skilled in the art to which it appertains to make and use the same.

The invention relates to gates and has for its principal object the provision of means for pivotally mounting the gate by which the gate post is relieved of the weight of the gate, the supporting means comprising a plate secured to the bottom rail of the gate and adapted to receive a pivot pin to engage an opening in a suitable support, such for instance as a post of wood, concrete, or other suitable material.

A further object of the invention is the provision of a gate that may be readily adjusted to different heights to admit of the use of the gate in the snows of winter when it may be raised above the ground to avoid interference with snow and lowered again in the summer.

The construction and operation and advantages of the invention will be described in detail hereinafter and the construction will be found illustrated in the accompanying drawings, in which—

Figure 1 is a front view of a gate embodying the improvements,

Figure 2 a detail view partly in section of the supporting member for the gate,

Figure 3 a view on a plane indicated by the line 3—3 of Figure 1, and

Figure 4 a view on a plane indicated by the line 4—4 of Figure 1.

In the drawings similar reference characters will be used to designate corresponding parts throughout the several views.

The invention is shown applied to a gate made up of a frame consisting of lengths of pipe 1 having the corners formed by elbow joints 2 and braced by cross bars 3 secured to the end pieces of the gate and secured where they are crossed. A suitable wire fabric 4 is secured to the frame consisting of the lengths of pipe 1 and the elbows 2. A plate 5 is secured to the bottom rail of the gate, said plate 5 having upstanding flanges 6 and outwardly extending ends 7 that are secured to the bottom rail by any suitable fastenings such as 8. The plate 5 is provided with an opening in which is a pin 9, and said pin engages an opening in a post 10 of wood or any other suitable material such for instance as cement. 11 indicates a gate post of ordinary structure to which is secured an L-shaped member 12 and having one of its arms extending inwardly of the post over the gate and provided with a down-turned portion 13 that is secured to the gate by any suitable fastening 14. The pivot pin 9 and the bolt or other fastening 14 are vertically alined and provide the pivot means for the gate, it being also understood that the plate 5 by engaging the top of the post 10 supports the gate and relieves the post 11 of the strain of the weight of the gate by hinges that are usually secured to the end rail of the gate. It will furthermore be understood that the height of the gate from the ground may be regulated by adjusting the height of the post 10 and adjusting the hanger 12 on the post 11 so that when it is desired to have the gate at a distance from the ground, as for instance in winter with heavy snows, this may be accomplished readily and the gate may be lowered after the winter snows have disappeared.

It will be apparent that the parts that have heretofore been described would be sufficient for a short gate, but where a long wagon gate is desired, it is frequently found necessary to support the outer end of the gate by means of a wheel 15 journaled on an axle 16 extending from a plate 17 that is secured to the end rail of the gate by means of U-shaped members 18.

It will be apparent that by this construction if it is desired to raise the gate to avoid heavy snows, as heretofore referred to, the plate carrying the shaft 16 may be adjusted so that the wheel 15 may properly operate to support the outer end of the gate.

What is claimed is:—

1. In a gate, a flanged plate secured to the bottom rail turnable with the gate, and adapted to seat on a suitable support, and a pin pivotally engaging said plate and support.

2. In a gate having top and bottom rails, an L-shaped hanger adapted to be secured to a gate post and having a downwardly bent portion pivotally engaging the top rail, and means engaging the bottom rail to support the gate.

3. In a gate having top and bottom rails, an L-shaped hanger adapted to be secured to a gate post by one of its arms, the other arm of said hanger having a downwardly bent portion pivotally engaging said top rail, a flanged plate secured to the bottom rail adapted to seat on a suitable support, and a pin pivotally engaging said plate and support.

In testimony whereof I affix my signature.

EDWARD ESCHENBACHER.